United States Patent
Shimizu et al.

(10) Patent No.: US 7,702,206 B2
(45) Date of Patent: Apr. 20, 2010

(54) OPTICAL WAVEGUIDE AND METHOD FOR MANUFACTURING THE SAME

(75) Inventors: Keishi Shimizu, Kanagawa (JP); Masahiro Igusa, Kanagawa (JP); Akira Fujii, Kanagawa (JP); Toshihiko Suzuki, Kanagawa (JP); Kazutoshi Yatsuda, Kanagawa (JP); Shigemi Ohtsu, Kanagawa (JP); Eiichi Akutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/188,452

(22) Filed: Aug. 8, 2008

(65) Prior Publication Data
US 2009/0103875 A1    Apr. 23, 2009

(30) Foreign Application Priority Data
Oct. 23, 2007 (JP) .............................. 2007-274721

(51) Int. Cl.
*G02B 6/10* (2006.01)
(52) U.S. Cl. ..................... 385/131; 264/1.24; 427/163.2
(58) Field of Classification Search ........................ None
See application file for complete search history.

(56) References Cited
U.S. PATENT DOCUMENTS 6,788,874 B1 * 9/2004 Ishikawa et al. ............ 385/141
6,819,853 B2 * 11/2004 Lam et al. ................... 385/131
2007/0114684 A1 * 5/2007 Ohtsu et al. ................ 264/1.24

FOREIGN PATENT DOCUMENTS

| JP | 8-286064 A | 11/1996 |
|---|---|---|
| JP | 10-300961 A | 11/1998 |
| JP | 11-352362 A | 12/1999 |
| JP | 2002-277664 A | 9/2002 |
| JP | 2003-207659 A | 7/2003 |
| JP | 2003-344680 A | 12/2003 |
| JP | 2004-078084 A | 3/2004 |
| JP | 2007-212899 A | 8/2007 |

\* cited by examiner

*Primary Examiner*—Omar Rojas
(74) *Attorney, Agent, or Firm*—Sughrue Mion, PLLC

(57) ABSTRACT

An optical waveguide includes: a center layer including at least two core layers whose edges are on substantially the same plane, and a first cladding layer provided between adjacent core layers; and a second cladding layer provided at least on both of front and rear surfaces of the center layer. At least surfaces of the core layer and the first cladding layer that are in contact with the second cladding layer include at least one resin selected from the group consisting of a resin having a hydroxyl group and a resin containing a silicon-silicon bond at a main chain thereof, and the second cladding layer includes a silicone resin.

9 Claims, 6 Drawing Sheets

OPTICAL WAVEGUIDE AND METHOD FOR MANUFACTURING THE SAME

CROSS-REFERENCE TO RELATED APPLICATION

This application is based on and claims priority under 35 USC 119 from Japanese Patent Application No. 2007-274721 filed on Oct. 23, 2007.

BACKGROUND

1. Technical Field

The present invention relates to an optical waveguide and a method for manufacturing the same.

2. Related Art

Recently, in a small-size instrument as represented by a cellular phone, a structure in which plural substrates are connected together by a hinge mechanism or a slide mechanism has been used commonly used in order to, for example, separate a display section and an operating section from each other, which may improve handling properties and portability. Further, improvements in performance of small-sized instruments necessitate high-speed, two-way transmission of vast amounts of digital data generated by attached imaging elements or the like, required data for a display section that allows high-definite display, and the like, to another substrate. For this reason, two-way data transmission technology using a polymeric optical waveguide that is disposed so as to pass through a hinge mechanism section or a slide mechanism section has been demanded.

Accordingly, in the polymeric optical waveguide used in the small-sized instrument, high flexibility adapted to the hinge mechanism or the slide mechanism is required. For example, assuming that the space between cell phone substrates connected by a slide mechanism is indicated by D, it is at least required that D be not more than 4 mm. Due to advancement of thin-model cell phones, it has been recently required that D be reduced to about 2 mm. The polymeric optical waveguide used therein is required to have only a small insertion loss and a small variation in the loss even when it is in a bending state corresponding to the above D value, and is repeatedly bent and unbent on the assumption of long-term use.

SUMMARY

According to an aspect of the invention, there is provided an optical waveguide including:

a center layer including at least two core layers whose edges are on substantially the same plane, and a first cladding layer provided between adjacent core layers; and a second cladding layer provided at least on both of front and rear surfaces of the center layer, wherein at least surfaces of the core layers and the first cladding layer that are in contact with the second cladding layer include at least one resin selected from the group consisting of a resin having a hydroxyl group and a resin containing a silicon-silicon bond at a main chain thereof, and the second cladding layer includes a silicone resin.

BRIEF DESCRIPTION OF THE DRAWINGS

Exemplary embodiments of the present invention will be described in detail based on the following figures, wherein.

DETAILED DESCRIPTION

<Optical Waveguide>

Figure 1A:
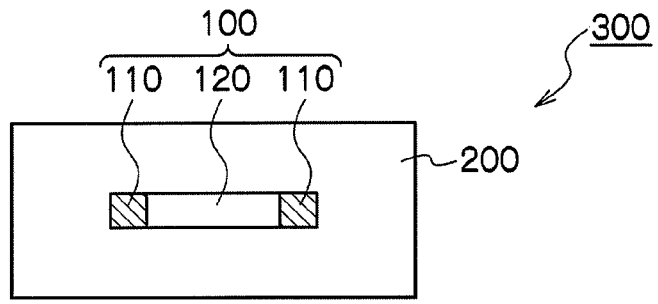
FIGS. 1A to 1D are schematic cross sectional views showing examples of the layer structure of an optical waveguide according to the present invention.

The optical waveguide of the present invention includes: a center layer including at least two core layers whose edges are on substantially the same plane, and a first cladding layer provided between adjacent core layers; and a second cladding layer provided at least on both of front and rear surfaces of the center layer, wherein at least surfaces of the core layers and the first cladding layer that are in contact with the second cladding layer include at least one resin selected from the group consisting of a resin having a hydroxyl group and a resin containing a silicon-silicon bond at the main chain thereof, and the second cladding layer includes a silicone resin.

The resin having a hydroxyl group may be an epoxy resin or an acrylic resin such as polymethyl methacrylate (PMMA). In this case, the core layers and/or the entire first cladding layer may be made from these resins.

In the process of preparing the optical waveguide, at least the surfaces of the core layers and the first cladding layer that are in contact with the second cladding layer may be subjected to a hydrophilizing process. When the hydrophilizing process is conducted, usable resins include not only the epoxy resin and acrylic resin, but also a resin having no hydroxyl group in a resin molecule thereof (e.g., polyolefin resins and polyimide resins). As the hydrophilizing process may include, for example, irradiation with an excimer laser.

Further, the resin containing a silicon-silicon bond at the main chain thereof may be a polysilane resin. If necessary, the surfaces of the core layers and the first cladding layer containing a polysilane resin may be further subjected to a hydrophilizing process.

Moreover, in order to reduce variations in the dimension along the shorter side of the core layer (core diameter) and in the distance between the core layers (core pitch) caused by an external force or temperature variations, the center layer may be made of a resin material having a high tensile modulus of elasticity. The tensile modulus of elasticity of the resin material is preferably 0.5 GPa or greater (or about 0.5 GPa or greater), and more preferably 1 GPa or greater. The upper limit value of the tensile modulus of elasticity is not particularly limited, but is preferably not more than 3 GPa (or not more than about 3 GPa) from practical standpoints including ease in obtaining the material. An epoxy resin is a representative material that has a tensile modulus of elasticity within the above range.

With regard to the resin materials that constitute the core layers and the first cladding layer, the kinds of resin and/or (when a mixture of two kinds of resin is used) the blend ratio thereof are selected such that the refractive index of the core layers is larger than those of the first cladding layer and the second cladding layer, and such that high transparency to transmitted light is obtained.

Further, the difference between the refractive index of the core layers and the refractive index of each of the first cladding layer and the second cladding layer is preferably 0.02 or greater, and more preferably 0.03 or greater. In the optical waveguide that is bent in its normal use as in the present invention, bending loss may be large when the difference in the refractive index is less than 0.02. The upper limit value of the difference in the refractive index is not particularly limited, but it is preferably not more than 0.5 from practical standpoints such as ease in obtaining the material, and is more preferably not more than 0.3.

The transmission loss of the resin material that constitute the core layers is preferably not more than 0.3 dB/cm in the wavelength range of the transmitted light, and more preferably not more than 0.1 dB/cm.

The epoxy resin, acrylic resin, and polysilane resin that can be used for the optical waveguide of the present invention are quite suitable as materials for optical waveguides that constitute optical transmission systems using a multi-mode Vertical Cavity Surface Emitting Laser (VCSEL) having a wavelength of 850 nm, with which low-cost data transmission systems that are frequently used in small-sized instruments and the like are easily realized.

Further, the optical waveguide of the present invention may be used in any instrument that uses an optical waveguide. In particular, since the optical waveguide of the present invention shows less deterioration in optical characteristics even when it is repeatedly bent, it is suitable to use the optical waveguide of the present invention in an apparatus in which the optical waveguide is repeatedly bent. Although such applications are not particularly limited, an example is a small-sized instrument such as the aforementioned cell phone.

In order to ensure excellent bending property, a smaller thickness of the center layer is more preferred. However, the thickness of the core in a multi-mode waveguide compatible with a wavelength of 850 nm is usually in the range from 40 µm to 80 µm in consideration of connectivity with a light receiving element and a light emitting element. Since the thickness of the center layer in the optical waveguide of the present invention is determined by the thickness of the core, the thickness of the center layer may be appropriately set to 40 µm when a higher bending property is desired, whereas the thickness of the center layer may be appropriately set within the range of from 40 µm to 80 µm when bending property and connection easiness are both considered.

The thickness of the second cladding layer (this "thickness" means the thickness of each portion of the second cladding layer located at either side of the center layer) is preferably 10 µm or more in consideration of stability of the coating process, and more preferably 20 µm or more. Since the second cladding layer itself has high bending property, bending strain may be absorbed even when the thickness thereof is increased. However, since an excessively large thickness of the second cladding layer may make difficult a wire connection to a small-sized instrument and may make smaller the effective curvature radius to be applied to the center layer, the thickness of the second cladding layer is preferably not more than 300 µm, and more preferably not more than 150 µm.

The optical waveguide may be required to have flame retardancy depending on applications. This is because the optical waveguide should be prevented from working as a fuse when an instrument having an optical waveguide ignites. Flame retardancy may be required in a small-size instrument, in particular.

For the purpose of reference, there is a UL-94 standard made by Underwriters Laboratories in U.S.A. as a standard of flame retardancy. This is a test method in which flames are applied to a test piece, and the burning time thereof and presence or absence of dropping matter are confirmed. In optical waveguides containing polymer materials that are used for small-sized instruments, the flame retardancy may be the rank "94HB", which indicates slow burning property or, more preferably, rank "94V", which indicates self-quenching property.

On the other hand, the epoxy resin or acrylic resin that can be used for the optical waveguide of the present invention has extremely poor flame retardancy.

Accordingly, when the center layer contains at least one kind of resin selected from the epoxy resin and the acrylic resin, the second cladding layer may contain a filler comprising an inorganic material. The incorporation of the filler may allow the flame retardancy of the optical waveguide to improve.

Further, use of the filler is likely to cause reduced bending property of the optical waveguide. However, in the optical waveguide of the present invention, since a silicone resin having excellent flexibility is used in the second cladding layer, occurrence of such a problem may be avoided.

Moreover, since a silicone resin having a low refractive index is used, it is easy to maintain a large difference in the refractive index between the core layer and the second cladding layer, and it is possible to easily enhance the effect of confining the transmitted light. Hence, an increase in the loss caused by use of the filler may also be easily avoided.

From the standpoint of ensuring sufficient flame retardancy, the amount of the filler contained in the second cladding layer is preferably 10 mass % or more (or about 10 mass % or more), and more preferably 20 mass % or more. If the content of the filler is too large, there may be a case in which the bending property of the optical waveguide is deteriorated. Therefore, the upper limit value of the content is preferably not much than 50 mass % (or not more than about 50 mass %), and more preferably not more than 40 mass %.

The filler comprising an inorganic material may be selected, without particular restriction, from particles made of a known inorganic material. Examples thereof include magnesium hydroxide, aluminum hydroxide, silicon oxide (silica), and titanium oxide.

In the preparation of the optical waveguide of the present invention, any known method for manufacturing an optical waveguide may be used, such as a method according to the invention for manufacturing an optical waveguide as mentioned below may be used. It is suitable to use the method according to the invention for manufacturing an optical waveguide described below particularly when the thickness of the optical waveguide of the present invention is 60 µm or less, Next, specific examples of the layer structure of the optical waveguide according to the present invention will be described further in detail by way of drawings.

FIGS. 1A to 1D are schematic cross sectional views showing examples of the layer structure of the optical waveguide according to the present invention. The cross sectional views are obtained by cutting the optical waveguide along a plane that is perpendicular to the optical path. In this drawing, reference numeral 100 denotes a center layer, reference numeral 110 denotes a core layer, reference numeral 120 denotes a first cladding layer (located between the core layers 110), reference numeral 122 denotes a first cladding layer (located at either end of the center layer 100), reference numerals 200, 200A and 200B each denote a second cladding layer, and reference numerals 300, 310, 320 and 330 each denote an optical waveguide.

The optical waveguide 300 shown in FIG. 1A has a structure in which a second cladding layer 200 is provided so as to coat both sides and both end surfaces of a center layer 100 that includes two core layers 110 and a first cladding layer 120 provided between the two core layers 110.

Figure 1B:
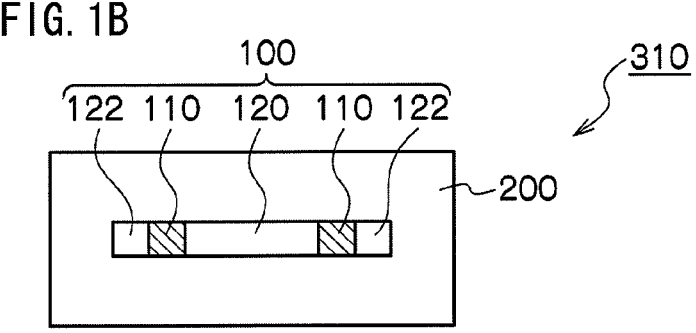

An optical waveguide 310 shown in FIG. 1B has a structure in which first cladding layers 122 are further provided at both end portions of the center layer 100 in the optical waveguide 300 shown in FIG. 1A.

Figure 1C:
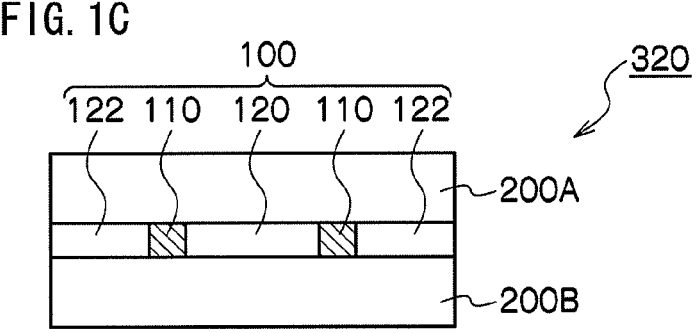

Further, an optical waveguide 320 shown in FIG. 1C has a structure in which second cladding layers 200A and 200B are provided so as to coat only both sides of the center layer 100 composed of two core layers 110, the first cladding layer 120 provided between the two core layers 110, and first cladding layers 122. The first cladding layers 122 are respectively provided at sides of the respective core layers 110 opposite to the first cladding layer 120.

Figure 1D:
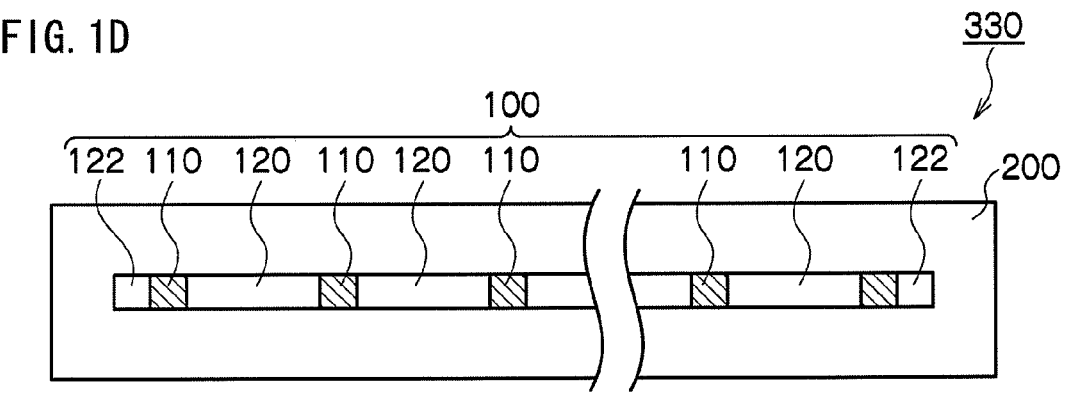

Moreover, an optical waveguide 330 shown in FIG. 1D has a structure having plural core layers 110 and is similar to the structure shown in FIG. 1B in terms of the basic layer structure, except that the number of core layers 110 is different.

Figure 2A:
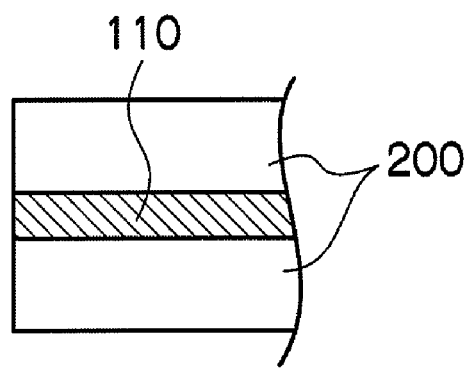
FIGS. 2A to 2C are schematic cross sectional views showing examples of an end surface portion of the optical waveguide according to the present invention.
Figure 2B:
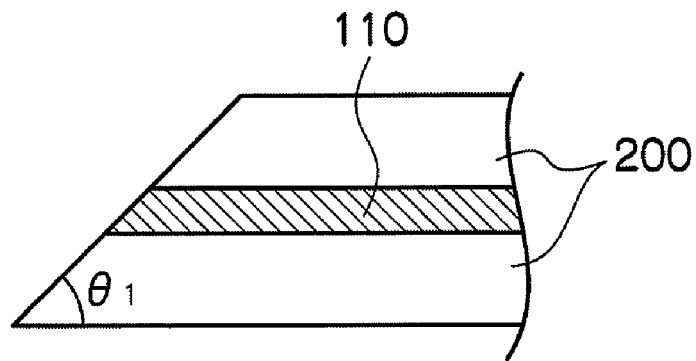
Figure 2C:
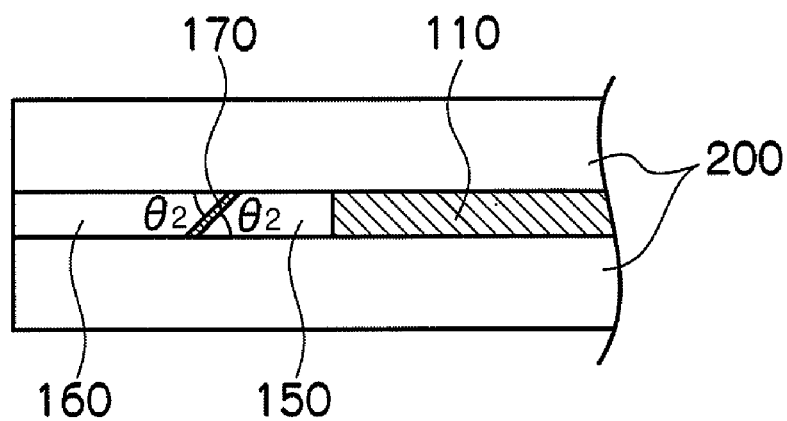

FIGS. 2A to 2C are schematic cross sectional views showing examples of an end surface portion of an optical waveguide according to the present invention. Specifically, they are cross sectional views obtained by cutting the optical waveguide along a plane that crosses the core layer in the center layer. In this drawing, reference numeral 150 denotes an optical transmitting member, reference numeral 160 denotes a support, reference numeral 170 denotes a mirror, and other reference numerals respectively denote the same members as in FIGS. 1A to 1D.

The end surface portion may be configured so as to merely form a surface perpendicular to the optical path direction in the core layer 110, as shown in FIG. 2A. However, the end surface portion may be configured so as to form a predetermined angle θ1 (for example, 45 degrees) with the optical path direction of the core layer 110 as shown in FIG. 2B, if necessary. Such a slanted end surface may be formed by a cutting process using a dicing blade or the like.

Further, a mirror portion may be provided at an end portion of the core layer 110 as shown in FIG. 2C.

The mirror portion has the same thickness as that of the core layer and formed by a block having a rectangular cross section. In the mirror portion, an optical transmitting member 150 and a support 160 are separated with an interface therebetween. The interface at which the optical transmitting member 150 and the support 160 are separated forms an angle θ2 (for example, 45 degrees) with a side of the optical transmitting member 150 or the support 160 that is shown as a horizontal line in FIG. 2C. A mirror 170 is disposed at the interface between the optical transmitting member 150 and the support 160. The mirror portion is disposed such that the optical transmitting member 150 side of the mirror portion adheres tightly to an end surface portion of the core layer 110 and such that the mirror 170 forms a predetermined angle θ2 (for example, 45 degrees) with the direction of the optical path of the core layer 110.

The optical transmitting member 150 may be selected from, without particular limitation, materials having high transmittance at the wavelength of the propagated light. In order to ensure adhesiveness to the end surface portion of the optical waveguide, for example, a UV-curable optical adhesive (available from NTT Advanced Technology Corporation) may be used.

The support 160 may be either a transparent material or an opaque material, and examples thereof include resin materials such as epoxy resins, acrylic resins, and polyolefin resins.

The mirror 170 is not particularly limited as long as it includes a material having high reflectivity to the wavelength of the propagated light. For example, a metal film made of gold, silver, aluminum, or an alloy thereof may be used. These metal materials are suitable in the point that they have high reflectivity to light having a wavelength of 850 nm used as VCSEL.

A method of providing the mirror portion to the end surface portion of the core layer 110 is not particularly limited. For example, a method may be used in which a member having a metal film as the mirror 170 is attached via an optical adhesive to the surface of the support 160 that has been cut at an angle θ2, and then the mirror portion, together the center layer, is coated with a material that will form the cladding layer 20.

<Method for Manufacturing an Optical Waveguide>

The method according to the invention for manufacturing an optical waveguide includes:

cutting a film (occasionally hereinafter referred to as a "multi-layer film") having at least two layers capable of functioning as core layers and at least one layer capable of functioning as a cladding layer that are alternately disposed, in the thickness direction of the film, thereby forming the center layer including at least two core layers and a cladding layer disposed between adjacent core layers; and coating the outer peripheral surface of the center layer with a material capable of functioning as a cladding layer, so as to form an optical waveguide.

Using the method according to the invention for manufacturing an optical waveguide, the cutting intervals may be arbitrarily selected when cutting the multi-layer film in the film thickness direction. Therefore, it is easy to reduce the thickness of the center layer, that is, reduce the thickness of the optical waveguide.

The cutting interval varies depending on applications of the optical waveguide to be prepared. The cutting interval refers to the thickness of the center layer formed by the cutting operation. For example, when the optical waveguide to be used in a small-sized instrument such as a cell phone is prepared, the cutting interval is preferably in the range of from 30 μm to 100 μm (or from about 30 μm to about 100 μm), and more preferably in the range of from 40 μm to 60 μm.

When the cutting interval exceeds 100 μm, there are cases in which it is difficult to prepare an optical waveguide having a bending property suitable for small-size instruments such as cell phones. Further, when the cutting interval is less than 30 μm, there are cases in which the cutting itself is difficult.

The multi-layer film may be readily prepared with a thickness accuracy of 1 μm for each layer by repeating spin coating or using a roll coater. The thicknesses of the respective layers that constitute the multi-layer film will be the core width and core pitch. Further, an optical waveguide having a desired core width, core pitch and core number may be manufactured by selecting the layer structure of the multi-layer film or the thicknesses of the respective layers. Since the method according to the invention for manufacturing an optical waveguide does not necessitate a core pattern forming step for obtaining a desired core width or core pitch as described above, the method may enable simplification of the manufacturing process.

The number of the layers serving as core layers contained in the multi-layer film is not particularly limited as long as it is not less than two, and the number of layers may be appropriately selected depending on applications of the optical waveguide to be prepared. The upper limit value of the number of the layers serving as the core is not particularly limited. From the standpoint of ease in production thereof, the thickness of the multi-layer film—the width of the optical waveguide to be prepared—is preferably not more than 1 mm. Further, the layers that form the front and rear surfaces of the multi-layer film may be either a layer serving as a cladding layer or a layer serving as a core layer.

The method for cutting the multi-layer film may be any processing method that provides a surface roughness of a cut surface that is suitable for use as a core layer of an optical waveguide. From the viewpoint of a balance among throughput, cutting-surface accuracy, and the product price of the cutting device, cutting may be conducted by a dicing saw.

The mode of the coating is not particularly limited, and well known coating film forming methods may be used, such as a dipping method including immersing a member that constitutes the center layer in a solution in which a material capable of functioning as a cladding layer is dissolved, and then taking the member out of the solution.

However, the coating may include: (1) providing a first portion of a material capable of functioning as a cladding layer on the bottom of a depressed portion of a mold having the depressed portion; (2) providing a member having the center layer on the first portion of the material disposed on the bottom of the depressed portion; and (3) providing a second portion of the material capable of functioning as a cladding layer so as to coat the center layer and the first portion of the material disposed on the bottom of the depressed portion.

By forming the cladding layer that coats the center layer through a process using such a mold, an optical waveguide having desired dimensions may be prepared without necessitating additional processes such as a further cutting step.

The inner surface of the depressed portion of the mold to be used may have releasability from the material that constitutes the cladding layer. In order to impart the releasability to the inner wall surface of the depressed portion, the material that constitutes the mold may have the releasability itself and/or the inner wall surface of the depressed portion may be coated with a release agent.

For example, when a silicone resin that is cured by application of heat or ultraviolet rays is used as the material that constitutes the cladding layer, materials that do not adhere to the material of the cladding layer after the material of the cladding layer is cured may be used for the mold. Examples of materials for the mold include resins having no hydroxyl group on their surface, such as polyethylene (PE), polyethylene terephthalate (PET), polypropylene (PP), and polyolefin.

With regard to each of the material that constitutes the core layer and the material that constitute the cladding layer, the kind of the material (and the blend ratio when a mixture of two or more materials is used) are selected such that the refractive index of the core layer is larger than that of the cladding layer, and such that high transmittance to the transmitted light is obtained.

The difference in the refractive index between the core layer and the cladding layer is preferably 0.02 or greater, more preferably 0.03 or greater. When an optical waveguide having bending property is prepared by using the method according to the invention for manufacturing an optical waveguide and the difference in the refractive index is less than 0.02, there are cases in which propagation loss is large. Although the upper limit value of the difference in the refractive index is not particularly limited, from practical standpoints such as ease in obtaining the material, the upper limit is preferably not more than 0.5, and more preferably not more than 0.3. The propagation loss of the material that constitutes the core layer is preferably not more than 0.3 dB/cm in the wavelength range of the transmitted light, and is more preferably not more than 0.1 dB/cm.

Further, resins may be used as materials that constitute the core layer and the cladding layer in order impart bending property to the optical waveguide.

In particular, the material (capable of) functioning as the cladding layer for coating the outer peripheral surface of the center layer may contain a silicone resin.

When the material functioning as a cladding layer and used for coating the outer peripheral surface of the center layer contains a silicone resin, cladding layers respectively containing silicone resins, which may be the same or different, are disposed on both surfaces of the center layer, so that bending strain caused by bending the optical waveguide is applies to the soft silicone resin. Therefore, an optical waveguide having excellent bending property may be prepared.

Further, the material that functions as a cladding layer and used for coating the outer peripheral surface of the center layer may be a silicone resin in which a filler comprising an inorganic material is dispersed. When the silicone resin includes a dispersed filler comprising an inorganic material, the flame retardancy of the optical waveguide may be improved.

The filler comprising an inorganic material is not particularly limited as long as the filler includes particles made of at least one well known inorganic material, and examples of the inorganic material include magnesium hydroxide, aluminum hydroxide, silicon oxide (silica), and titanium oxide.

Next, specific examples of the method according to the invention for manufacturing an optical waveguide will be described in more detail with reference to the drawings.

Figure 3A:
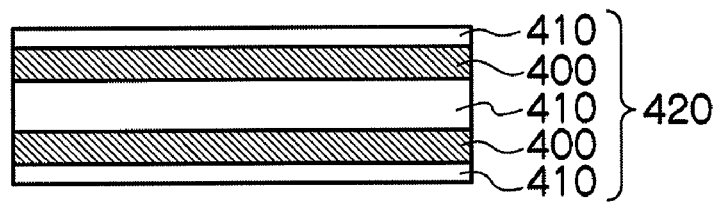
FIGS. 3A to 3G are schematic diagrams showing an example of a method for manufacturing an optical waveguide according to the present invention.
Figure 3B:
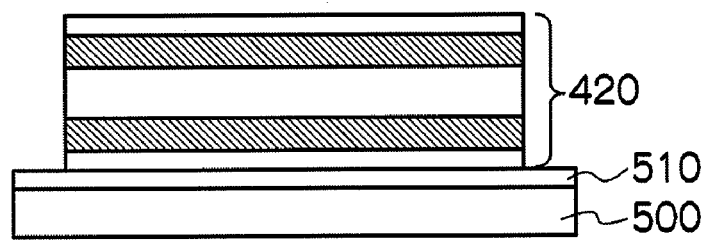
Figure 3C:
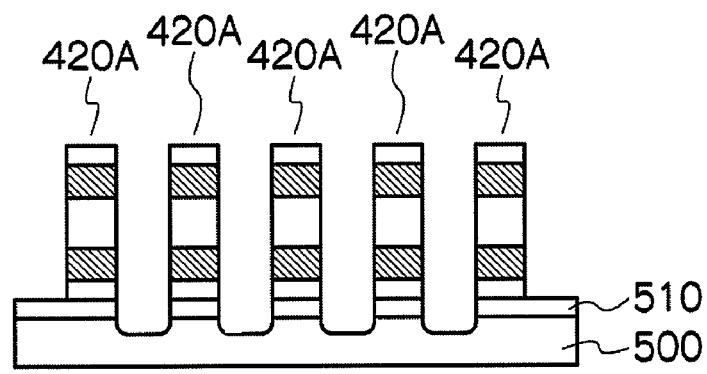
Figure 3D:
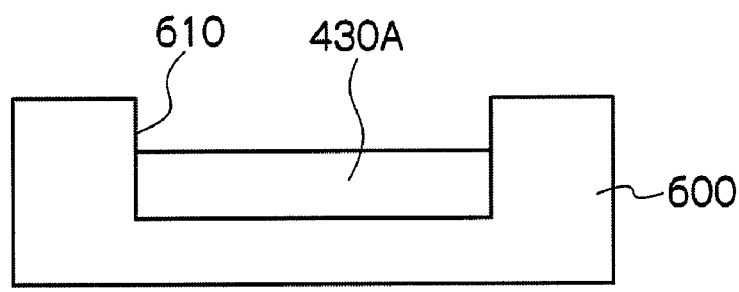
Figure 3E:
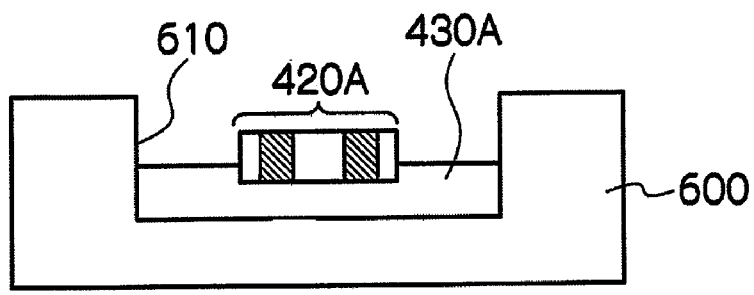
Figure 3F:
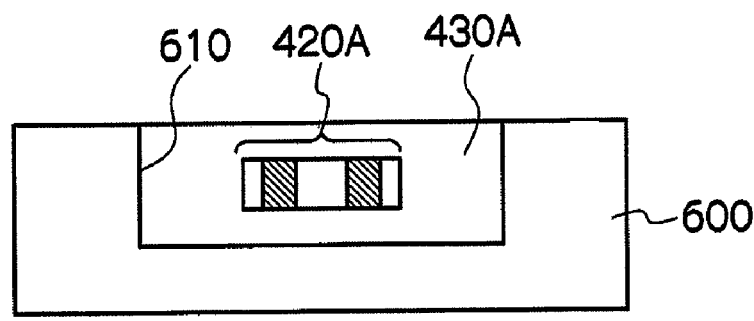
Figure 3G:
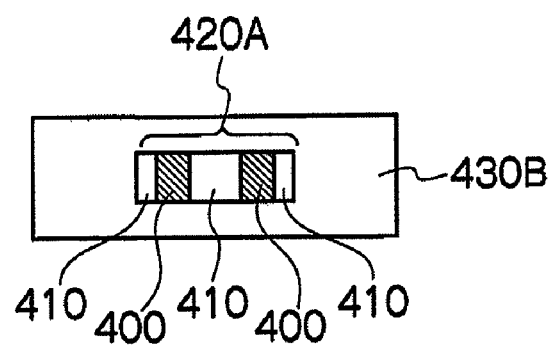

FIGS. 3A to 3G are schematic diagrams showing an example of the method for manufacturing an optical waveguide of the present invention. FIG. 3A shows a schematic cross sectional view of a multi-layer film used for producing an optical waveguide, FIG. 3B is a schematic cross sectional view showing the state in which the multi-layer film is fixed to a platform, FIG. 3C is a schematic cross sectional view showing the state after the multi-layer film is cut to form a member that can form the center layer, FIG. 3D is a schematic cross sectional view showing a state in which a material capable of functioning as a cladding layer is disposed in a depressed portion of a mold having the depressed portion, FIG. 3E is a schematic cross sectional view showing a state in which the member that can form the center layer is disposed on the material capable of functioning as a cladding layer disposed in the depressed portion of the mold, FIG. 3F is a schematic cross sectional view showing a state in which the material capable of functioning as a cladding layer is disposed in the depressed portion of the mold so as to coat the material capable of functioning as a cladding layer disposed in the depressed portion of the mold and the member that can form the center layer, and FIG. 3G is a schematic cross sectional view of an optical waveguide taken out from the mold.

In FIGS. 3A to 3G, reference numeral 400 denotes a core layer (or a layer that functions as a core layer), reference numeral 410 denotes a cladding layer (or a layer that functions as a cladding layer), reference numeral 420 denotes a multi-layer film, reference numeral 420A denotes a center layer (or a member that can form a center layer), reference numeral 430A denotes a material that will form a cladding layer, reference numeral 430B denotes a cladding layer (obtained by curing the material 430A), reference numeral 500 denotes a platform, reference numeral 510 denotes an adhesive layer, reference numeral 600 denotes a mold, and reference numeral 610 denotes a depressed portion.

First of all, the multi-layer film 420 shown in FIG. 3A is prepared. The multi-layer film 420 has a structure in which layers 410 functioning as cladding layers and layers 400 functioning as core layers are alternately disposed, and has three layers 410 functioning as cladding layers and two layers 400 functioning as core layers. The core pitch of the optical waveguide to be prepared may be controlled by the thickness of the layer 410 which is disposed at the center and which functions as a core layer.

Subsequently, the multi-layer film 420 is fixed onto the platform 500 via an adhesive layer such as a double-sided adhesive tape or an adhesive (FIG. 3B). In this state, the multi-layer film 420 is cut into in the thickness direction of the multi-layer film 420 by using a dicing saw or the like, thereby forming, as remaining portions, the members 420A that can form center layers (FIG. 3C). In this cutting process, the thickness of the members 420A that can form center layers may be controlled by selecting appropriate cutting intervals in the widthwise direction of the multi-layer film 420.

In order to form the cladding layer 430 for coating the center layer 420A, the material 430A that will form a cladding layer is disposed in the depressed portion 610 of the mold 600 having the depressed portion 610 from the bottom of the depressed portion 610 to a depth that is about half the depth of the depressed portion 610 (FIG. 3D).

Thereafter, the member 420A that can form a center layer, detached from the platform 500, is disposed on the material 430A that will form a cladding layer so that the longer sides of the cross section of the member 420A extends in the horizontal direction, and the member 420A is pressed into the material 430A that will function as a cladding layer so that a lower half of the member 420A subsides in the material 430A (FIG. 3E).

In this state, the material 430A that will form a cladding layer is disposed in the depressed portion 610 so that the member 420A that can form a center layer is coated with the material 430A, and the interior of the depressed portion 610 is fully filled (FIG. 3F). Subsequently, the material 430A that will form a cladding layer is cured by application of a stimulus (such as light and/or heat) that allows curing of the material 430A. Thereafter, an optical waveguide having the center layer 420A coated with the cladding layer 430B is released and taken out of the mold 600 (FIG. 3G).

Figure 4A:
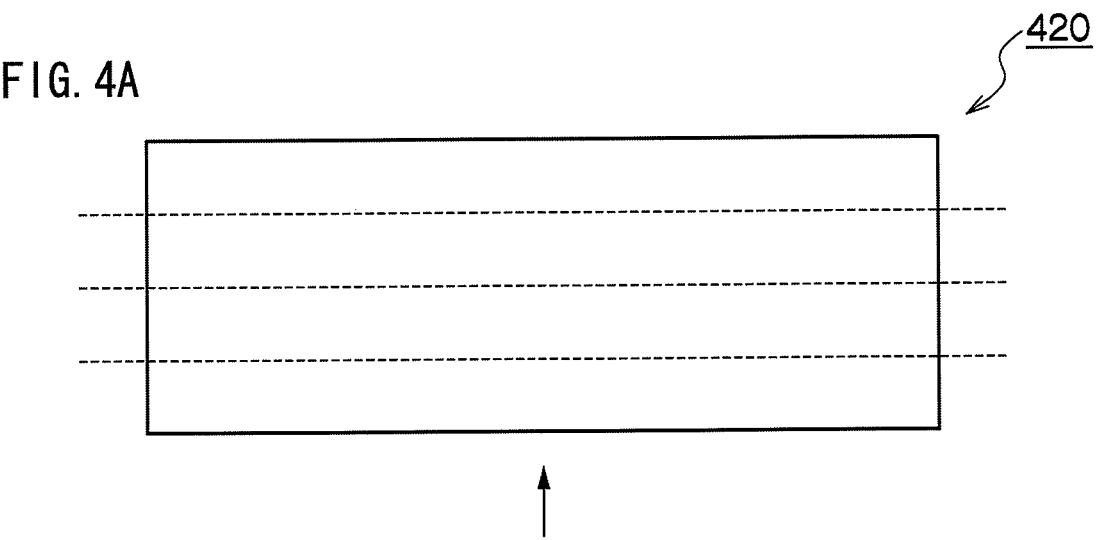
FIGS. 4A and 4B are rough schematic diagrams showing an example of the shape of a multi-layered film used for preparing an optical waveguide.
Figure 4B:
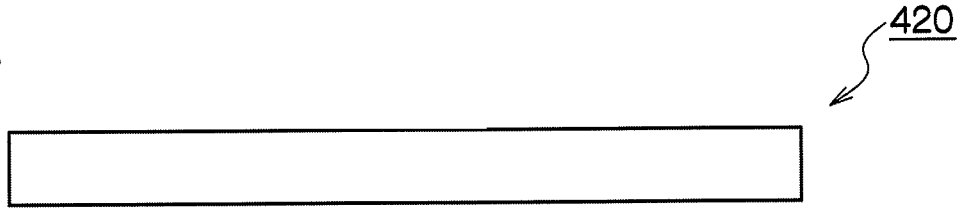

Incidentally, when an optical waveguide having a structure in which the end surface is simply perpendicular to the direction of the optical path of the core layer 110 as shown in FIG. 2A is prepared, a structure having a configuration shown in FIGS. 4A and 4B may be used as the multi-layer film. FIGS. 4A and 4B are rough schematic diagrams showing an example of the shape of a multi-layer film used for preparing an optical waveguide. FIG. 4A shows a plan view of the multi-layer film, and FIG. 4B shows a side view of the multi-layer film (viewed from the direction indicated by the arrow in FIG. 4A). In these figures, reference numeral 420 denotes the multi-layer film, and the dotted lines each indicate the direction along which the multi-layer film 420 is cut. In FIGS. 4A and 4B, illustration of the respective layers that form the multi-layer film 420 (such as the layers functioning as the core layers and the layers functioning as the cladding layers) is omitted.

In the example shown in FIGS. 4A and 4B, an optical waveguide may be prepared by preparing the rectangular multi-layer film 420 having vertically-cut end surfaces and cutting the multi-layer film 420 in a direction that is parallel with the longer side of the multi-layer film 420 (in FIG. 4A, the direction indicated by the dotted line).

Further, when an optical waveguide having a structure in which an end surface portion forms a predetermined angle $\theta 1$ (for example, 45 degrees) with the direction of the optical path of the core layer 110 is prepared as shown in FIG. 2B, the multi-layer film 420 shown in FIGS. 4A and 4B may be further cut so as to form a predetermined angle with the longer side of the multi-layer film 420.

Figure 5:
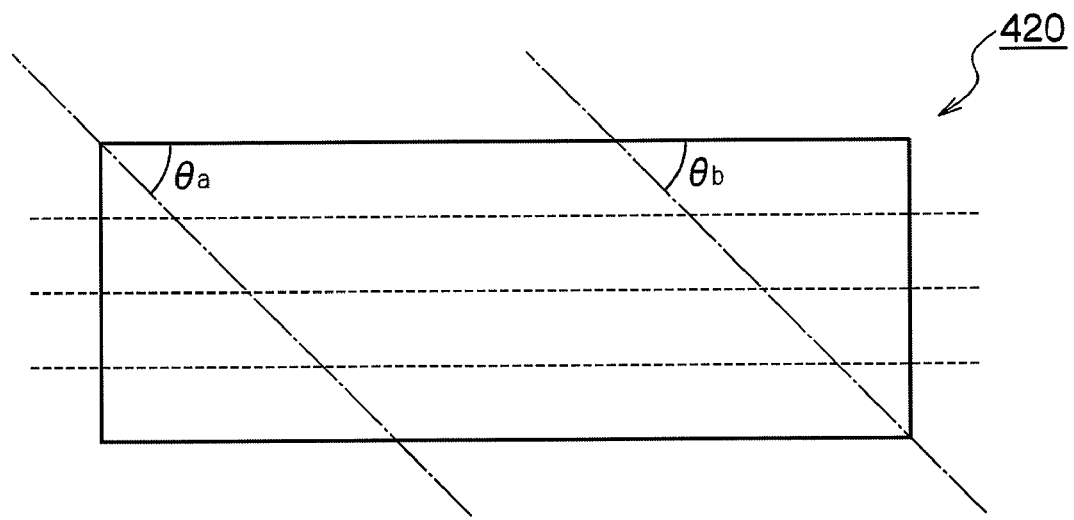
FIG. 5 is a rough schematic diagram showing another example of the shape of a multi-layered film used for preparing an optical waveguide.

FIG. 5 is a rough schematic diagram showing another example of the shape of the multi-layer film used for preparing an optical waveguide, and the reference numeral 420 and the dotted lines shown in FIG. 5 respectively have the same meanings as those of the reference numeral 420 and the dotted lines shown in FIG. 4A. In FIG. 5, two one-dot chain lines also show the cutting lines. One of the one-dot chain lines passes one corner of the rectangular multi-layer film 420. The other one-dot chain lines passes another corner that is, among the remaining corners, furthest from the one corner. The two one-dot chain lines respectively form angles $\theta a$ and $\theta b$ (wherein $\theta a$ and $\theta b$ are angles that are greater than 0 degree but less than 90 degrees) with the longer sides of the multi-layer film 420.

In the example shown in FIG. 5, for example, when the angles $\theta a$ and $\theta b$ both equal to 45 degrees, the traveling direction of the incident light entering the optical waveguide from one end surface of the optical waveguide and the traveling direction of the light coming out of the other end surface may be parallel to each other in the same direction.

Moreover, when the optical waveguide in which the mirror portion as shown in FIG. 2C is attached to an end surface of the core layer 110, for example, the multi-layer film 420 may be cut off after the mirror portion is attached to the end surface of the multi-layer film.

Figure 6:
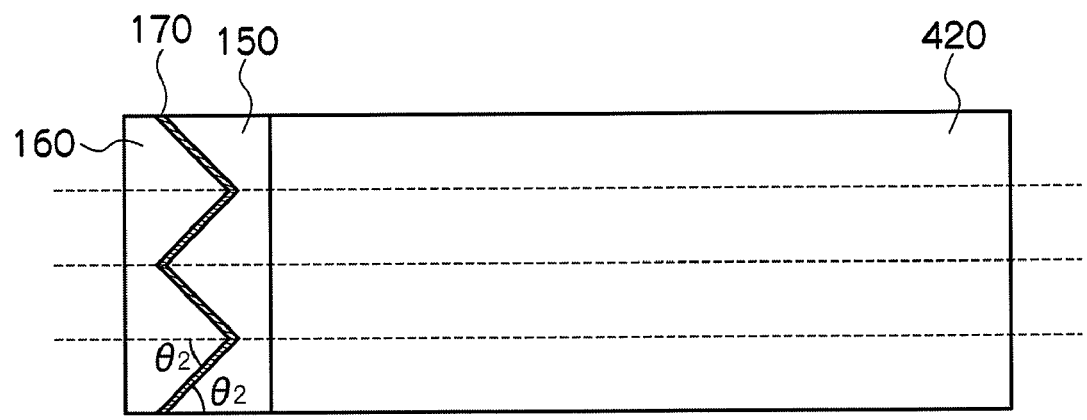
FIG. 6 is a rough schematic diagram showing still another example of the shape of a multi-layered film used for preparing an optical waveguide.

FIG. 6 is a rough schematic diagram showing another example of the shape of the multi-layer film used for preparing the optical waveguide, and reference numeral 420 and dotted lines shown in FIG. 6 have the same meaning as those indicated by reference numeral 420 and dotted lines shown in FIG. 4A. Further, reference numerals 150, 160 and 170 have the same meaning as in FIG. 2C.

In the example shown in FIG. 6, a support 160 has a saw-toothed surface at one side, and a mirror 170 provided on the saw-toothed surface. The saw-toothed surface is adhered with an optical adhesive to an end surface of the multi-layer film 420, wherein the end surface is located at one of the shorter sides of the multi-layer film 420, and the adhesive is a member that becomes an optical transmitting member 150 after cured. Thereafter, the multi-layer film is cut along the dotted lines. The aforementioned adhesive bonding is carried out so that the respective cutting lines (the dotted lines) substantially cross respective peak and bottom portions on the saw-toothed surface (that is to say, the support 160 to be used has a peak-bottom pitch on the saw-toothed surface that is substantially the same as the cutting interval). Subsequently, an optical waveguide shown in FIG. 2C may be obtained by conducting the coating operation.

In the cutting operation, since the peak portions and the bottom portions on the saw-toothed surface may be utilized as alignment marks, positioning at the cutting operation is easy and the cutting accuracy may also be improved.

Although the saw-tooth surface of the support 160 shown in FIG. 6 has repetition of protrusions having a shape of an isosceles triangle, the saw-tooth surface is not limited to such a configuration. For example, the saw-tooth surface of the support 160 may have repetition of protrusions having a shape of a right-angled triangle.

The method for preparing the support 160 equipped with the mirror 170 is not particularly limited. For example, the support 160 having the mirror 170 may be obtained by the following method: a member having a saw-toothed surface at one side and obtained by processing of a resin sheet with a stamper is prepared, a metal film that forms the mirror 170 is provided thereon by vacuum deposition or sputtering, and then the member is cut so as to correspond to the thickness of the multi-layer film 420.

EXAMPLES

The present invention will be described hereinafter by reference to examples. However, the examples should not be construed as limiting the invention.

Example 1

Preparation of Optical Waveguide

Following the procedure shown in FIGS. 3A to 3G, an optical waveguide having the structure shown in FIG. 1B is prepared in such a manner as described below.

First, a multi-layer film is prepared in which epoxy resin A (available from NTT Advanced Technology Corporation) for the core layer, having a tensile modulus of elasticity of 1.5 GPa, a refractive index of 1.60 at a wavelength of 850 nm, and a material loss of 0.06 dB/cm, and epoxy resin B (available from NTT Advanced Technology Corporation) for the first cladding layer, having a tensile modulus of elasticity of 1.5 GPa and a refractive index of 1.53 at a wavelength of 850 nm, are alternately disposed in layers (five layers in total). The respective thicknesses of these layers are shown below.

B layer/A layer/B layer/A layer/B layer=10/45/205/45/10 (µm)

(The "A layer" means a layer made of epoxy resin A, and the "B layer" means a layer made of epoxy resin B). Further, the size of the multi-layer film is 125 mm×50 mm.

The multi-layer film thus prepared is attached to a dicing tape and is fixed to a dicing saw (DAD321; available from Disco Corporation). By cutting the multi-layer film with a dicing blade having a width of 50 µm at a feeding pitch of 95 µm, a member that forms a center layer having a width of 45 µm is prepared. The members thus obtained are each cut by the dicing saw to have a longitudinal dimension of 120 mm.

Each of the members forming the center layers obtained by the cutting is detached by a pair of tweezers and placed in a mold made of polyethylene. The mold has a depressed portion having a depth of 0.3 mm, a width of 1.5 mm and a length of 120 mm. The depressed portion is coated in advance with a thermosetting silicone resin (available from Sin-Etsu Silicones) having a refractive index of 1.4 at a wavelength of 850 nm to a height of 0.15 mm from the bottom of the depressed portion. The member that forms the center layer is protected in advance by a fluorine-containing film so that the thermosetting silicone resin does not adhere to the end portion of the waveguide core, and then the member that forms the center layer is put at the center of the depressed portion with respect to the widthwise direction. Then, the silicone resin in a thickness of 0.15 mm is further applied onto the depressed portion so as to fully fill the depressed portion, and thereafter, a heat treatment at 80° C. is conducted for one hour. As a result, an optical waveguide having a length of 120 mm, a thickness of 300 µm, a core diameter of 45 µm and a pitch between the two core layers of 250 µm is obtained.

Evaluation of Optical Waveguide

The following evaluations are conducted on the obtained optical waveguide:

(i) propagation loss is measured in a state in which the optical waveguide is extended linearly and in a state in which one point on the optical waveguide in the longitudinal direction thereof is bent so that the curvature radius becomes 1 mm, and an amount of increase in propagation loss in the bent state compared to the linear state (=propagation loss in the bent state−propagation loss in the linear state) is obtained;

(ii) insertion loss is measured before and after one point on the optical waveguide in the longitudinal direction is continuously bent 100,000 times to give a curvature radius of 1 mm, and an amount of increase in insertion loss after the repeated bending test compared to before the repeated bending test (=propagation loss after the repeated bending test−propagation loss prior to repeated bending test) is obtained.

As a result, it is found that the propagation loss in the linear state is 0.08 dB/cm, the amount of increase in insertion loss at the time of bending is 0.1 dB or less, and the amount of increase in insertion loss after repeated bending of 100,000 times is 0.1 dB or less.

Further, when the optical waveguide is placed horizontally and is ignited from one end thereof, the combustion speed corresponds to 60 mm/minute.

The aforementioned evaluation results are shown in Table 1 below.

Further, the error of the core pitch of the obtained optical waveguide is 2 µm or less. Moreover, when the optical waveguide is fixed to a light receiving/emitting element with a UV-curable optical adhesive (for 30 seconds at an intensity of 100 mW/cm$^2$ at a wavelength of 365 nm), adhesion can be accomplished with an error of 4 µm or less, and the connection loss is a negligible value.

Example 2

An optical waveguide is prepared in the same manner as in Example 1 except that in place of the silicone resin used for forming the second cladding layer, a mixture obtained by adding 30 mass parts of filler (aluminum hydroxide, average particle size: 200 nm) to 100 mass parts of the silicone resin, which is then cured by being left at normal temperature (25° C.) for 24 hours, is used. The evaluation results are shown in Table 1 below.

Example 3

An optical waveguide is prepared in the same manner as in Example 1 except that (i) acrylic resin A (available from NTT Advanced Technology Corporation) for the core layer having a tensile modulus of elasticity of 1.6 GPz, a refractive index of 1.6 at a wavelength of 850 nm, and a material loss of 0.08 dB/cm is used as the resin for the A layers contained in the multi-layer film, and (ii) acrylic resin B (available from NTT Advanced Technology Corporation) for the first cladding layer having a tensile modulus of elasticity of 1.6 GPa, a refractive index of 1.5 at a wavelength of 850 nm, and a material loss of 0.1 dB/cm is used as the resin for the B layers contained in the multi-layer film. The evaluation results are shown in Table 1 below.

Example 4

An optical waveguide is prepared in the same manner as in Example 1 except that (i) polysilane resin A (available from Nippon Paint Co., Ltd.) for the core layer having a tensile modulus of elasticity of 1.2 GPz, a refractive index of 1.53 at a wavelength of 850 nm, and a material loss of 0.03 dB/cm is used as the resin for the A layers contained in the multi-layer film, and polysilane resin B (available from Nippon Paint Co., Ltd.) for the first cladding layer having a tensile elasticity modulus of 1.2 GPa, a refractive index of 1.50 at a wavelength of 850 nm, and a material loss of 0.03 dB/cm is used as the resin for the B layers contained in the multi-layer film. The evaluation results are shown in Table 1 below.

Example 5

An optical waveguide is prepared in the same manner as in Example 1 except that the multi-layer film used in Example 1 is replaced by a multi-layer film having the structure: A layer/B layer/A layer (=45/205/45 (μm)). The evaluation results are shown in Table 1 below.

Example 6

An optical waveguide is prepared in the same manner as in Example 2 except that the multi-layer film used in Example 2 is replaced by a multi-layer film having the structure: A layer/B layer/A layer (=45/205/45 (μm)). The evaluation results are shown in Table 1 below.

Comparative Example 1

An optical waveguide is prepared in the same manner as in Example 1 except that functional norbornene resin A (available from JSR Corporation) for the core layer having a tensile modulus of elasticity of 1.8 GPz, a refractive index of 1.54 at a wavelength of 850 nm, and a material loss of 0.04 dB/cm is used as the resin for the A layers contained in the multi-layer film, and functional norbornene resin B (available from JSR Corporation) for the first cladding layer having a tensile modulus of elasticity of 1.8 GPa, a refractive index of 1.51 at a wavelength of 850 nm, and a material loss of 0.04 dB/cm is used as the resin for the B layers contained in the multi-layer film. The evaluation results are shown in Table 1 below.

Comparative Example 2

An optical waveguide is prepared in the same manner as in Example 1 except that the total thickness of the waveguide is set to 180 μm by using a fluororesin that is curable at normal temperature (FG-3030Z-40, available from Fluoro Technology) as the resin to be filled in the depressed portion of the mold, and curing the resin at normal temperature. The evaluation results are shown in Table 1.

Comparative Example 3

UV-curable epoxy resin C (available from NTT Advanced Technology Corporation) for a cladding, having a tensile modulus of elasticity of 1.5 GPa, a refractive index of 1.51 at a wavelength of 850nm, and a material loss of 0.06 dB/cm, is provided, by spin coating, on a silicon wafer coated with copper, so as to form a layer having a thickness of 50 μm. The obtained resin layer is then cured by exposure to UV rays. Subsequently, in a similar manner, UV-curable epoxy resin D (available from NTT Advance Technology Corporation) for a core, having a tensile modulus of elasticity of 1.5 GPa, a refractive index of 1.57 at a wavelength of 850 nm, and a material loss of 0.06 dB/cm, is provided by spin coating to form a layer having a thickness of 50 μm, and the obtained resin layer is exposed to UV rays by an aligner via a photomask corresponding to a core pattern, and uncured resin is washed away with an organic solvent, whereby a core pattern is formed. Then, resin C in a thickness of 50 μm is provided similarly by spin coating and UV exposure. A post-baking treatment is conducted at 120° C. for 30 minutes, and the layered body thus obtained is cut by a dicing saw into strips having a length of 120 mm and a width of 1.5 mm, which are then detached from the substrate by immersing the substrate in an alkali liquid to dissolve copper. In this way, an optical waveguide having a structure in which a core is enclosed by the cladding resin C is prepared. The evaluation results are shown in Table 1.

TABLE 1

| | | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Preparing Method | | FIG. 3 | FIG. 3 | FIG. 3 | FIG. 3 | FIG. 3 | FIG. 3 | FIG. 3 | FIG. 3 | direct exposure process |
| Cross Sectional Structure | | FIG. 1B | FIG. 1B | FIG. 1B | FIG. 1B | FIG. 1B | FIG. 1A | FIG. 1B | FIG. 1B | — |
| Thickness of Optical Waveguide (mm) | | 250 | 250 | 250 | 250 | 250 | 250 | 250 | 250 | 150 |
| Core Layer Material | | epoxy resin | epoxy resin | acrylic resin | polysilane resin | epoxy resin | epoxy resin | functional norbornene resin | epoxy resin | epoxy resin |
| Cladding Layer Material | 1st Cladding Layer | epoxy resin | epoxy resin | acrylic resin | polysilane resin | epoxy resin | epoxy resin | functional norbornene resin | epoxy resin | epoxy resin |
| | 2nd Cladding Layer | silicone resin | silicone resin + filler | silicone resin | silicone resin | silicone resin | silicone resin + filler | silicone resin | fluororesin | |
| Propagation Loss In Linear State (dB/cm) | | 0.08 | 0.09 | 0.08 | 0.06 | 0.08 | 0.1 | 0.08 | 0.08 | 0.08 |
| Amount Of Increase In Insertion Loss At The Time Of Bending (dB) | | 0.1 or less | 0.1 or less | 0.1 or less | 0.1 or less | 0.1 or less | 0.1 or less | 0.2 | 0.1 or less | 0.2 |

TABLE 1-continued

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Amount Of Increase In Insertion Loss After Repeated Bending Of 100,000 Times (dB) | 0.1 or less | 0.1 or less | 0.1 or less | 0.1 or less | 0.1 or less | 0.1 or less | 1 | 0.1 or less | 2 |
| Combustion Speed (mm/Min) | 60 | 10 or less | 60 | 60 | 60 | 10 or less | 60 | 600 or greater | 600 or greater |

The invention claimed is:

1. A method for manufacturing an optical waveguide, the method comprising:
    providing a film having at least two layers capable of functioning as core layers and at least one layer capable of functioning as a cladding layer that are alternately disposed in the thickness direction of the film;
    cutting through the entire thickness of the film, thereby forming a center layer including at least two core layers and a cladding layer disposed between adjacent core layers; and
    coating an outer peripheral surface of the center layer with a material capable of functioning as a cladding layer, so as to form the optical waveguide.

2. The method for manufacturing an optical waveguide according to claim 1, wherein the cutting of the film is conducted with a dicing saw.

3. The method for manufacturing an optical waveguide according to claim 1, wherein the interval of the cutting is from 30 µm to 100 µm along a width direction of the film.

4. A method for manufacturing an optical waveguide, the method comprising:
    cutting a film having at least two layers capable of functioning as core layers and at least one layer capable of functioning as a cladding layer that are alternately disposed in the thickness direction of the film, thereby forming a center layer including at least two core layers and a cladding layer disposed between adjacent core layers; and
    coating an outer peripheral surface of the center layer with a material capable of functioning as a cladding layer, so as to form the optical waveguide;
    wherein the coating of the outer peripheral surface of the center layer comprises:
    providing a first portion of the material capable of functioning as the cladding layer on a bottom of a depressed portion of a mold;
    providing a member having the center layer on the first portion of the material disposed on the bottom of the depressed portion; and
    providing a second portion of the material capable of functioning as the cladding layer so as to coat the center layer and the first portion of the material disposed on the bottom of the depressed portion.

5. The method for manufacturing an optical waveguide according to claim 1, wherein the material capable of functioning as the cladding layer for coating the outer peripheral surface of the center layer includes silicone resin.

6. The method for manufacturing an optical waveguide according to claim 1, wherein the material capable of functioning as the cladding layer for coating the outer peripheral surface of the center layer is a silicone resin in which a filler comprising an inorganic material is dispersed.

7. The method for manufacturing an optical waveguide according to claim 1, wherein the coating of the outer peripheral surface of the center layer comprises:
    providing a first portion of the material capable of functioning as the cladding layer on a bottom of a depressed portion of a mold;
    providing a member having the center layer on the first portion of the material disposed on the bottom of the depressed portion; and
    providing a second portion of the material capable of functioning as the cladding layer so as to coat the center layer and the first portion of the material disposed on the bottom of the depressed portion.

8. The method for manufacturing an optical waveguide according to claim 1, wherein the coating of the outer peripheral surface of the center layer comprises coating each external surface of the center layer with the material capable of functioning as the cladding layer.

9. A method for manufacturing an optical waveguide, the method comprising:
    cutting a film fixed onto a platform and having at least two layers capable of functioning as core layers and at least one layer capable of functioning as a cladding layer that are alternately disposed in the thickness direction of the film, thereby forming a center layer including at least two core layers and a cladding layer disposed between adjacent core layers;
    detaching the center layer from the platform; and
    coating an outer peripheral surface of the center layer with a material capable of functioning as a cladding layer, so as to form the optical waveguide.

* * * * *